US012749051B2

(12) United States Patent
Poonia

(10) Patent No.: US 12,749,051 B2
(45) Date of Patent: Sep. 29, 2026

(54) SYSTEM AND METHOD FOR COMPREHENSIVE COMMUNITY CONNECTIVITY PLATFORM

(71) Applicant: Bobby Singh Poonia, Leicester (GB)

(72) Inventor: Bobby Singh Poonia, Leicester (GB)

( * ) Notice: Subject to any disclaimer, the term of this patent is extended or adjusted under 35 U.S.C. 154(b) by 0 days.

(21) Appl. No.: 18/644,868

(22) Filed: Apr. 24, 2024

(65) Prior Publication Data

US 2024/0273642 A1 Aug. 15, 2024

(51) Int. Cl.
*G06Q 10/40* (2026.01)

(52) U.S. Cl.
CPC .................................... *G06Q 10/40* (2026.01)

(58) Field of Classification Search
CPC ...................................................... G06Q 50/01
See application file for complete search history.

(56) References Cited

U.S. PATENT DOCUMENTS 12,277,609 B1 * 4/2025 Shaw .................... H04L 67/535
2024/0296184 A1 * 9/2024 Mckenzie .............. G11B 27/34

OTHER PUBLICATIONS

Randy Jay C. Solis, To meet or not to meet? Measuring motivations and risks as predictors of outcomes in the use of mobile dating applications in China, 2017, p. 204-223 (Year: 2017).*

* cited by examiner

*Primary Examiner* — Ibrahim N El-Bathy
(74) *Attorney, Agent, or Firm* — Kevin J Fournier Intellectual Property Legal Services Ltd; Kevin J Fournier

(57) ABSTRACT

The proposed invention discloses a system and method for connecting with other individuals having similar interest, which is a versatile and customizable mobile platform that connects a community. It offers features such as partner search for activities and gym, scheduling, in-built chat for communication, feedback, social media feed for sharing fitness content, safe dating with verified members, access to wellbeing-related content and experts, online sessions with inspiring speakers, and a supplier interface for staff. This comprehensive system promotes campus connectivity, fosters wellbeing, facilitates training and dating opportunities, and enhances communication within the community.

4 Claims, 3 Drawing Sheets

SYSTEM AND METHOD FOR COMPREHENSIVE COMMUNITY CONNECTIVITY PLATFORM

TECHNICAL FIELD

The present invention relates to social networking, more particularly; the present invention relates to system and method for connecting with other users based on their preferences and interests locally and globally.

BACKGROUND

The following description includes information that may be useful in understanding the present invention. It is not an admission that any of the information provided herein is prior art or relevant to the presently claimed invention, or that any publication specifically or implicitly referenced is prior art.

In the era of the mobile Internet, the convergence of various industries and the integration of mobile technology have significantly impacted our lives. Traditional industries are being transformed through the integration of mobile connectivity, and schools, colleges, campus universities, businesses and general recreational centers are no exception. A dedicated app can greatly improve the efficiency, convenience of daily life whilst improving the wellbeing of individuals contributing to a more fruitful and productive society.

Existing fitness, health, wellbeing, social (dating) and lifestyle apps prioritize providing users with limited sector but comprehensive resources to support their fitness, health, wellbeing and lifestyle, and social (dating) journey. These individual standalone apps typically offer workouts, health tracking, wellbeing content, social lifestyle content, dating guides, routines, support, and matchmaking, which are designed to cater to various users' various interest and experience levels. For example, on health apps, users can access a wide range of exercises with instructional videos or images to ensure proper form and technique. Furthermore, fitness apps often include meal planning features, giving users access to pre-made meal plans or tools to customize their own plans based on specific dietary goals and restrictions. These meal plans can be adjusted to suit various calorie and macro-nutrient needs, allowing users to track their nutritional intake and make informed choices about their diets. Calorie and macro counting are crucial components of fitness apps, as they enable users to monitor their calorie intake and maintain a balance between carbohydrates, proteins, and fats. Many apps come with extensive food databases, simplifying the process of logging meals and calculating nutrition. These apps may lack the specific features required for community connectivity, such as finding training partners or scheduling in-person sessions based on specific criteria. Amid the COVID-19 pandemic, the increasing rate of suicides in gyms worldwide has highlighted the need for a system that fosters a sense of community, connecting individuals both inside and outside the gym environment. This system and innovation was inspired by the inventor whose gym during COVID-19, lost 2 members through suicide and later was identified that the individuals struggled with mental health. Such a unique system would encourage establishments to support one another and deliver a comprehensive 360-degree approach to tackling well-being and any underlying health issues.

Dating apps may not provide a safe and verified platform for members to connect and date within the community.

While dating apps offer a convenient way to connect with others, safety and verification remain critical concerns for users across all age groups and communities. Further, wellness platforms may not offer the seamless integration of content sharing, messaging, and access to qualified specialists. Online training platforms may not focus on the unique needs of members or other users to offer features such as feedback and social media integration.

The fitness landscape faces challenges arising from the disconnected nature of gyms and health facilities worldwide. Traditional gym memberships often come with rigid constraints, limiting users to specific locations and lengthy commitments. This lack of flexibility has become a hindrance for individuals seeking versatile fitness options. The global fitness community also experiences limitations in social connections and community-building, hindering the sharing of experiences, routines, and goals. As technology advances, the increasing interest in digital fitness and flexible workout routines underscores the need for innovative solutions that seamlessly integrate physical and virtual fitness components together. Recognizing the importance of community and social connections in user's fitness journey, there is a growing demand for platforms that foster a sense of belonging beyond individual gym memberships. The ideal solution should transcend geographical boundaries and provide a supportive environment for users to connect globally.

Further, Gym pass which is a gym pass that would be redeemed at the facilities physical location for a cost is limited to that physical location. It does not look at other venues, locations or other facilities potentially partnering with the venue/gym. Many gyms worldwide have coffee houses within them and also partners and affiliates. Any offerings for any of the above would be on separate mobile applications.

Wellbeing platforms at present are offering either Ai tools and disconnecting users from real life people interactions with wellbeing practitioners and coaches. Many users are finding that sessions conducted are being voiced and ran entirely by Ai leaving people somewhat feeling alone and mental health issues are not being resolved.

Addressing these limitations and creating a holistic platform that encompasses training, dating, social interactions, forums, wellbeing, passes and online sessions specifically tailored to the environment are crucial in solving this dilemma. The concerns regarding safety including real life verification of users on dating, social interaction apps are not limited to members but extend to facilities and the general public where these users are. As a result, there exists a need for improvements over the prior art and more particularly for a more efficient way.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

The all-in-one innovative platform is a revolutionary solution that leverages geo-location technology to connect various facilities worldwide, including but not limited to health/sports facilities, retail outlets, universities, schools, and academies, with their respective community members. This comprehensive system offers a unified, super app solution encompassing matchmaking, communication, booking, scheduling, payment processing, and seamless communication, all within a single app accessible on both iOS and Android platforms. By integrating geo-location, the platform enables users to discover and access nearby facilities, users and services conveniently. Members within these communities can effortlessly, matchmake, schedule appointments, online sessions, webinars, classes, or events and make secure payments directly within the app, streamlining the entire process on a single application.

Additionally, the app facilitates real-time communication between facility managers, staff, coaches and community members, fostering better engagement and enhancing the overall user experience. Users can receive updates, announcements, and personalized notifications based on their preferences and interests, creating a dynamic and interactive ecosystem. The platform's versatility caters to a wide range of users, from the local general public members to global establishments (e.g., coffee houses, sports centers, and gym's) including educational facilities/universities. It simplifies the management of facilities for administrators and optimizes the user experience for community members, making it an indispensable tool for individuals seeking convenience, efficiency, and connectivity within their respective communities.

Further, the innovative system and method is a comprehensive 360 connectivity platform aka Gym Connect also referred to as its copyright and trademarked name "GC", designed to connect any community without geographical bounds, through one mobile application running on mobile or any computing device. The mobile application can be accessible on both iOS and Android devices and any other operating system. The system offers a range of features and functionalities tailored to meet the diverse needs of members, trainers, and staff.

The system provides a training module, which allows individuals including members and nonmembers to find partners in the gym or other venues for various activities such as, fishing, tennis, sports activities, walking, gaming, or simply finding a coffee buddy from any geo location. They can schedule in-person sessions based on their preferences and communicate with their partners through in-built chat functionality, including calls, messages, and video chats. Therefore, resulting in a mentally stronger community by enabling individuals to connect like never before. Gym Connect not only encourages active user participation through feedback, fostering a supportive community but also offers a dynamic social media feature. Unlike other platforms, Gym Connect's system allows users to view content through pre-set filters, minimizing the potential for offensive material. Users can share exercises, recipes, playlists, guides, posts, contributing to a personalized and engaging experience. To ensure a safe community, Gym Connect implements member verification based on real-life feedback, adding an extra layer of authenticity and trust. This holistic approach creates a unique digital appeal where fitness and non-fitness enthusiasts can connect, share, and support each other in their wellness journeys.

The Dating module within Gym Connect prioritizes secure and verified dating experiences among community members. Members can engage in dating based on real-life feedback and customized questions, fostering genuine connections. The platform allows users to schedule traditional coffee dates or opt for more active pursuits for example sporting exercises or yoga sessions with verified members in a safe place. The verification process is strengthened through the use of blockchain technology, ensuring secure identity checks without storing sensitive information on conventional servers. This innovative approach enhances user privacy and security. The module also features an in-built chat functionality facilitating seamless communication, including calls, messages, and video chats. Additionally, the integration of artificial intelligence on the backend enhances the matching process, allowing users to be paired based on physical features, contributing to a personalized and trustworthy dating environment.

Gym Connect's dating module revolutionizes the dating experience with Automated AI Dating Requests, Personal Calendar Integration, Relationship guidance and Support via a confidential specialist 1-2-1 chat feature utilizing GC unique coin system. The advanced AI automates matchmaking, seamlessly integrates dates into personal calendars, and allows users to seek expert advice from specialists via earned or purchased coins. This coin-based system not only enhances privacy and security but also rewards user engagement, creating a comprehensive and rewarding dating environment within the platform.

The wellbeing platform incorporates a group chat support function that provides users with the option to participate anonymously or using a chosen name. This group chat feature fosters a supportive and inclusive environment where community members can connect and discuss various topics whilst professionals including admin can facilitate the conversations. Additionally, the platform includes a 1-2-1 specialist area that allows users to access experts from around the world. Users can seek personalized support and guidance from specialists in different fields, enhancing the accessibility of professional assistance regardless of geographic location.

Gym Connect's Forum module takes user well-being to new heights by offering instant access to a wealth of well-being-related content, including blogs, videos, and posts. Members can actively engage with wellness experts, leverage educational resources, and stay abreast of topics related to mental and physical well-being. A standout feature allows members to curate personal well-being boards, facilitating the tracking of meaningful content aligned with their interests and goals, fostering a personalized and engaging experience. The platform encourages direct messaging to qualified specialists for personalized guidance and support, facilitated by in-built chat functionality for seamless communication through calls, messages, and video chats. This comprehensive and interconnected approach not only creates a holistic well-being support system but also provides a secure space for users worldwide to interact, learn, and seek professional advice. Additionally, aspiring blog writers can contribute by uploading their posts for admin approval, offering potential career advancements, while video content covering meditation, healing music, and other well-being aspects is readily accessible on users' mobile channels, further enriching their well-being journey.

A group chat support function is built in which allows you to enter as an anonymous user or named-alongside 1-2-1 specialist area where staff can be from all over the world.

The Online/Exclusive Sessions module grants members access to inspiring speakers, including athletes, celebrities, entrepreneurs and much more through videos. They can attend live or pre-recorded sessions, ask questions, interact, and book sessions with personal trainers, life coaches, wellbeing coaches or any other coach, globally.

The Gym Pass feature in Gym Connect introduces a way for users to access fitness facilities and communities without the need for physical visits. This innovative system allows users to purchase passes seamlessly, providing them with the opportunity to engage with the gym community even before setting foot on the premises-a capability that was previously unavailable. One notable aspect is the automated generation of passes, each accompanied by a date and time stamp, enhancing security measures and preventing fraudulent duplication. Gym Pass also goes beyond the gym by allowing businesses or facilities to create their own pass. For example a coffee club such as Starbucks or Costa could create a coffee club and use the pass functionality to attract more users, increase profitability and potentially help combat loneliness/improve mental health of individuals by bringing a community together, which has been shifted since the COVID Pandemic. This not only streamlines the process for users looking to interact with others but also ensures the integrity of the pass system, by creating a more efficient and secure experience for all participants.

The Content management module component enables community staff, individuals, and entrepreneurs to upload schedules, classes, timetables, and more. It also allows community coaches, trainers, and staff to respond to member's issues and wellness concerns through the app's messaging and chat functionality. The wellbeing platform functions as an early indicator for any issues individuals may be experiencing by encouraging them to openly share their thoughts, feelings, and challenges within a safe and supportive environment. By providing various communication channels, such as group chat support and 1-2-1 interactions with specialists from around the world, the platform creates opportunities for users to express themselves freely and seek assistance when needed. Through its interactive forum module, which offers access to wellbeing-related content like blogs, videos, and posts, users can engage with wellness experts and gain valuable insights into various aspects of well-being. This exposure to educational resources empowers individuals to become more self-aware and recognize potential signs of distress or difficulties early on, whilst still being able to connect with their users on the other parts of the application (e.g. discuss topics on wellbeing content, with friends connected on health, and vice versa for the other areas)

Overall, the connectivity system provides a versatile and customizable platform to cater to the diverse needs of the community. It enhances new and existing communication channels, promotes wellbeing, facilitates training, dating or social interaction opportunities, and fosters a supportive and engaged environment.

The platform or interface is equipped to provide comprehensive services such as but not limited to Health, Dating (Social), Wellbeing and Online Session. The Services are further categorized for each standalone section. Each section is an entire application in its own right for example, health has sections such as, venue, level, activity, session EG: relaxation and Meditation, HIIT (high Intensity training), Strength training, Sports Activities, Coffee and Chat. Don't mind (allows you to skip the filters for a greater audience match however still only seeing your original search field in person or virtual).

Further, the interface provides option of instant messaging and health information related to calories burn or notifications based on which section of the application the user is using.

Further, the user is able to select the type or category or stage of training. The user can choose between beginner, Advanced, Balanced or free-style.

A notification system is configured to alert the user for a new coffee request or new connection request to perform an activity. The user can accept or reject any such request.

The summary of the invention does not necessarily disclose all the features essential for defining the invention. The invention may reside in a sub-combination of the disclosed features. The various combinations and sub-combination are fully described in the detailed description.

BRIEF DESCRIPTION OF DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure.

The diagrams are for illustration only, which thus is not a limitation of the present disclosure, and wherein.

DETAILED DESCRIPTION OF DRAWINGS

Figure 1:
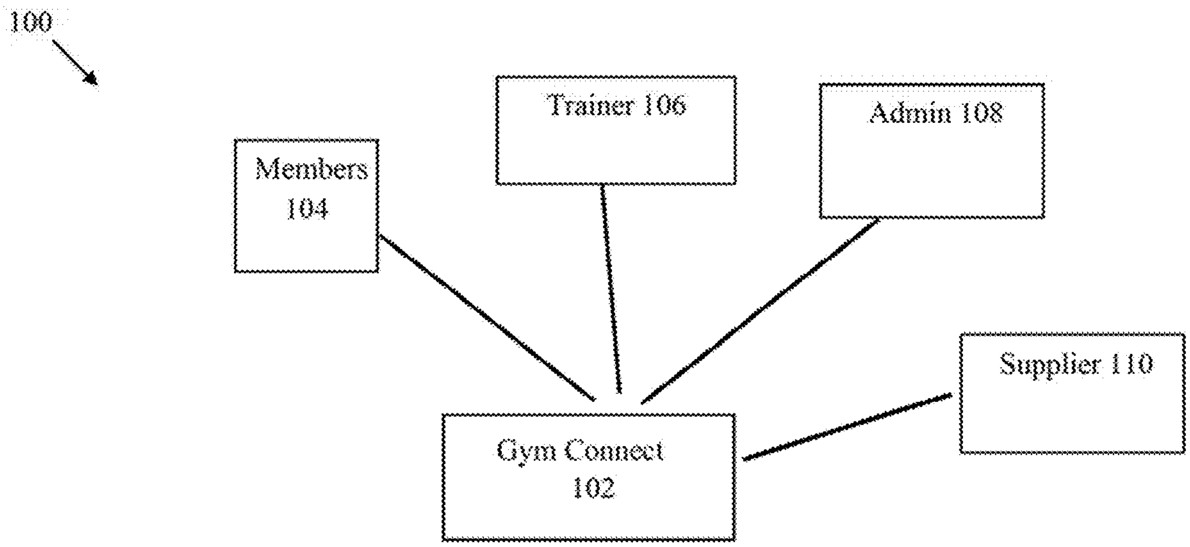
FIG. 1 illustrates roles and functionalities of each user type in the community connectivity platform, in accordance with one of the embodiments of the current invention.

Those skilled in the art will understand that when an element or part in the drawings is referred to as being "on" (or "connected" to or "coupled" to or "attached" to) another element, it can be directly on (or attached to) the other element or intervening elements may also be present. Furthermore, relative terms such as "inner", "outer", "upper", "above", "lower", "beneath", and "below", and similar terms, may be used herein to describe a relationship of one element to another element. It is understood that these terms are intended to encompass different orientations of the device in addition to the orientation depicted in the figures.

To make the objectives, technical solutions, and advantages of this application clearer, the following clearly and completely describes the technical solutions in this application with reference to accompanying drawings in this application. Obviously, described embodiments are a part rather than all of embodiments of this application. All other embodiments obtained by a person of ordinary skill in the art based on embodiments of this application without creative efforts shall fall within the protection scope of this application.

It should be understood that in this application, "at least one (item)" refers to one or more and "a plurality of" refers to two or more. The term "and/or" is used to describe an association relationship between associated objects and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof means any combination of these items, including a single item (piece) or any combination of a plurality of items (pieces). For example, at least one item (piece) of a, b, or c may indicate a, b, c, a and b, a and c, b and c, or a, b, and c, where a, b, and c may be singular or plural.

The wellbeing platform is fully customizable, allowing facilities and users to personalize activities, sessions, tasks, goals, and more to meet users' needs and preferences. This adaptability enhances user engagement and promotes individualized wellness within the community it serves. It facilitates seamless communication, collaboration, and engagement in various aspects of fitness, wellness, and community life.

FIG. 1 illustrates roles and functionalities of each user type in the community connectivity platform (100), in accordance with one of the embodiments of the current invention.

Some of the roles and responsibilities of each user type in the community connectivity platform aka Gym Connect (102) are as mentioned below:

- Members (104): Members are the primary users of the community connectivity platform, and they benefit from its various features and functionalities. Here's how member interact with the platform:
- Trainers (106): Trainers play a crucial role in the community connectivity platform ecosystem as they provide guidance, expertise, and support to members. Trainers can create profiles on their own gym connect supplier Interface and offer their services to members seeking training partners, or friends, looking for fitness and general guidance. They can be matched with members based on specific criteria such as date, time, location, goals or issues. Trainers can communicate with members through the app's chat functionality, schedule, and conduct sessions, and provide guidance and feedback to enhance member's health and wellbeing journey. Trainers can contribute to the app's online sessions by sharing their knowledge and expertise through live or pre-recorded videos. They can offer insights, tips, and answer members' questions to provide valuable guidance and motivation.
- Administrators (108): Administrators have a crucial role in managing the community connectivity platform and ensuring its smooth operation. Administrators oversee user registration, authentication, and profile management. They manage user data, ensure security and privacy, and handle any issues related to user accounts. They also verify trainers and coaches' profiles through a dedicated portal sign up.
- Supplier (110): Administrators can use the supplier interface, integrated with the community connectivity platform, to manage schedules, classes, timetables, and other relevant information. They can respond to member issues and wellness concerns through the app's messaging/chat functionality, providing support and assistance when needed. The supplier interface is a valuable tool that grants access to community staff, individuals, teachers, practitioners and budding entrepreneurs, enabling them to upload schedules, classes, timetables, and other relevant information. With proper authorization, community coaches, teachers, practitioners, trainers, and staff can utilize the app to respond to user issues, including wellness concerns, by utilizing the messaging and chat functions. This streamlined communication channel enhances support and facilitates timely assistance for members, promoting a comprehensive approach highlighting speed to address user's needs.

The Supplier interface allows users to access trainers, teachers, coaches, practitioners, staff seamlessly through day passes or single session passes from all of Gym Connects categories or where they are applicable. Users can now hire a trainer by combining the purchase of a gym day pass with personal training sessions, which is currently missing in the industry. This innovative approach streamlines the process, offering users the flexibility to engage with fitness facilities and trainers in a cohesive manner. Users can also take advantage of Gym pass feature and look to take advantage of all the other events that is scheduled outside the gym including coffee clubs, football day passes, tennis club passes and much more. Trainers themselves can utilize the Supplier interface to upload their services, making it an efficient platform for both users and professionals. This integration not only enhances user experience by providing a one-stop solution for accessing both gym and other facilities but also a personalized approach to the customer journey. It also empowers trainers to showcase and offer their services in a user-friendly manner.

Overall, the community connectivity platform creates a connected ecosystem where members, trainers, and administrators can interact, engage, and support each other in their fitness and wellness journeys. The app enhances communication, fosters collaboration, and facilitates access to resources and expert guidance, making the community a vibrant and supportive community all in one super app, the latest generation of mobile applications.

The app enables member interactions by facilitating connections with training partners for virtual or in-person gym sessions, sports activities, walks, gaming, or even casual coffee meetups. Users can effortlessly connect with fellow members of a specific facility or venue by inputting their location, creating instant connections for various fitness, recreational, and leisure activities. This feature promotes new social interactions, motivation, and collaboration among users with diverse fitness goals. Members have the flexibility to search for partners based on specific criteria such as date, time, location, gender, fitness level, and shared goals. The platform allows for scheduling in-person sessions, fostering communication through the in-built chat functionality, and providing real-life feedback to build a trusted global fitness community. Additionally, members can utilize the app's social media feed to share exercises, recipes, playlists, and more, creating engagement with their peers and utilizing filters to tailor their content preferences. Administrators play a role in community engagement by sharing news and updates, keeping members informed and connected. This social aspect enhances the overall sense of community, encouraging knowledge-sharing and making the Gym Connect platform a vibrant and dynamic space where users can connect, inspire, and support each other in their fitness journeys.

With Gym Connect's global access to day passes, users can now effortlessly purchase passes without the need to physically visit the gym. This transformative feature allows individuals worldwide to access gym facilities, connect with the community, and build meaningful connections, eliminating the traditional requirement of being present at the venue to meet and engage with others. This streamlined process removes barriers, enabling users to connect seamlessly with fellow fitness or general social enthusiasts without the necessity of in-person introductions or alternative communication channels. The platform's innovation in providing remote access to gyms and any other venues fosters a more inclusive and interconnected community, revolutionizing the way individuals can engage with users globally. Other platforms that provide a gym pass feature rely on other standalone applications to meet the complete 360 platform that gym connect provides (E.g., wellness, dating, wellbeing)

The app's dating or social interaction platform provides a safe environment for members especially female members to connect and date verified community members in the application. Members can use the platform to find compatible matches based on real-life feedback and tailored questions. Only limited information about a member is provided until acceptance by other member to protect their privacy. They can schedule traditional coffee dates or engage in activities such as sporting exercises or yoga sessions. Overall, Gym Connect's emphasis on providing a safer dating experience through limited information disclosure aligns with the importance of user protection, particularly in regions where female crimes are higher. By only providing the city where a user is based and not disclosing actual personal information, the app prioritizes user privacy and security nor does it ask to connect users to their social media profiles. This approach is particularly significant in countries with higher rates of female crimes, where protecting users' identities is of utmost importance. The safer element introduced by Gym Connect creates a more secure environment for dating and social interactions. Users can confidently connect with potential partners without the fear of exposing their personal details. This anonymity reduces the risk of potential harm or harassment and helps build trust among users. By focusing on safety measures, Gym Connect seeks to empower its users, especially in regions where female safety is a concern. This approach can encourage more individuals, including women, to use the app, knowing that their privacy is safeguarded but dating can be conducted in a safe environment with verified users. Communication with potential partners is made convenient through the app's chat and video functionality. Users can easily connect with each other in real-time, fostering meaningful conversations and enhancing the overall dating experience. This feature allows users to get to know each other better and build a connection before deciding to meet in person, providing a secure and seamless communication platform for forming meaningful relationships. Gym Connect dating goes one step further by automating the dating process by using AI calendar integration and automatic dating requests once users are connected, therefore speeding up the normal "get to know" user process. Gym connect dating also provides access to 1-2-1 relationships specialists all over the world through its messaging service, with its overall aim of improving individuals wellbeing.

The Gym Connect Forum platform offers members a comprehensive space to access well-being content, encompassing blogs, videos, music and posts. Members can actively engage with this content by liking, sharing, commenting, and following wellness experts, fostering a sense of community and knowledge-sharing. The unique feature of creating personalized well-being boards enables users to curate and track meaningful posts aligned with their interests. Additionally, members can directly message qualified well-being specialists using the app's chat functionality, facilitating guidance-seeking, experience sharing, and participation in discussions on diverse wellness topics. The platform also caters to aspiring blog writers, providing a function to upload their posts to administrators for potential publishing. This not only offers a chance for career advancement but also allows writers to showcase their work to a select audience, creating opportunities for recognition and engagement within the community.

Members can access one or more inspiring speakers, including athletes, celebrities, and entrepreneurs, through the app's online sessions. They can view live or prerecorded videos and ask questions to one or more speakers directly through application or via an online web portal link.

Gym Connect's platform goes beyond traditional dating and Social features, enabling users to access live or prerecorded videos from speakers and engage in interactive Q&A sessions based on a variety of topics. The app's versatility allows users to view content directly through the app or via an online web portal link, creating a comprehensive and engaging experience that promotes learning, connection, and community engagement. Additionally, members can book sessions with personal trainers, life coaches, or wellbeing coaches to receive personalized guidance and support.

In addition, Gym Connect is designed to transcend geographical barriers, allowing users from around the world to connect with each other. This global connectivity fosters a sense of community, enabling users to share experiences, such as workout routines, fitness goals, coffee dates, wellness sessions and more with like-minded individuals.

A key feature of Gym Connect is the introduction of virtual or physical gym passes. Users can access the app and purchase a day pass for a specific gym or any other venue (EG tennis club, football club pass, cricket pass, baseball, coffee house, Starbucks pass, costa pass, festival pass etc.) directly through the platform. This feature is an enhancement to the existing concept of the traditional gym pass idea—but comes with added functionalities that distinguish it from traditional methods. Gym Connect's gym passes include a sophisticated date and time stamp system. This system is automatically generated to avoid duplications and streamline the user experience whilst also minimizing and reducing the risk of fraudulent passes that can be easily replicated. Each pass is unique and tied to a specific date and time, ensuring that users can access the gym or feature only during the designated period.

Unlike traditional passes that focus solely on a physical access, Gym Connect goes a step further by eliminating the need for physical presence to connect with other gym users. The platform enables virtual interactions, creating a global community where users can engage with each other, regardless of their physical location. Gym Connect places a strong emphasis on community building. Users can connect with fellow fitness enthusiasts globally, fostering a supportive environment. This community aspect adds a social dimension to the fitness journey, allowing users to motivate each other and share insights. The automated date and time stamp system not only provides convenience but also serves as a preventive measure against pass duplications. This feature ensures the integrity of the pass system and enhances security. The Gym Connect app is designed with a user-friendly interface, making it easy for users to navigate, purchase passes, and connect with others. The intuitive design contributes to a seamless and enjoyable experience for fitness enthusiasts.

The Gym Pass feature in Gym Connect introduces a dynamic and global approach to fitness and other venue access, allowing gym owners and other businesses to upload day passes via a dedicated supplier interface app. This feature facilitates seamless connectivity between gym owners, potential users, and existing gym members. The below is a breakdown of the key components:

1) Supplier interface for Gym Owners: Gym owners, business owners, trainers, coaches, staff etc. have access to a specialized supplier interface where they can upload day passes for their respective gyms/venues. This streamlined interface ensures ease of use, enabling gym/venue owners to manage and promote their offerings effectively.

2) Global Access to Day Passes: The Gym Pass feature extends globally, allowing fitness enthusiasts from around the world to explore and purchase day passes for participating gyms. This global accessibility promotes diversity and flexibility in workout options, catering to the preferences and needs of a broad user base.

3) Purchase and Connection without Physical Visit: Users interested in accessing a particular gym can purchase day passes directly through the Gym Connect platform. Importantly, this process eliminates the need for a physical visit to the gym for pass acquisition. The seamless digital transaction enhances convenience for users whilst also giving them an option to hire a trainer in one pass.

4) Community Access: In addition to gym access, users who purchase day passes gain entry into the gym's private community through Gym Connect. This community aspect fosters interaction, providing users with the opportunity to connect with fellow fitness enthusiasts and share experiences, tips, and motivation. This is also applicable to day pass that other establishments that are enrolled or have access to on the Gym connects pass program.

5) Connecting with Gym Members: The Gym Pass feature includes a unique element where users, upon purchasing a day pass, can connect with existing members of the gym. This creates a networking opportunity, allowing users to find workout partners, seek advice, business contacts and enhance their overall gym/venue experience.

6) Streamlined Pass Management: The supplier interface provides gym/venue owners with tools for efficiently managing day passes. This includes real-time updates on pass availability, utilization metrics, and a user-friendly interface for seamless pass management.

7) Promotion and Visibility: Gym owners can use the Gym Pass feature to promote their facilities and attract a broader audience. The global accessibility of day passes increases the visibility of participating gyms, potentially leading to enhanced membership engagement whilst providing more traffic to trainers who are self-employed.

8) User Reviews and Ratings: Users who purchase day passes have the opportunity to leave reviews and ratings, providing valuable feedback for both gym owners and potential pass purchasers. This user-generated content helps maintain a transparent and trustworthy platform.

Gym Connect's innovative Rating and Reviews feature is a cornerstone of the platform, designed to establish transparency, trust, and a sense of community across all user categories-including gym owners, coaches, trainers, and individual users. This universal system ensures that feedback is not only comprehensive but also helps in building stronger communities within the platform. To maintain the integrity of the feedback system, Gym Connect employs rigorous fraud prevention measures. These measures include identity verification processes and robust algorithms to detect and mitigate potentially fraudulent activities. By prioritizing verified user identities, the platform enhances the credibility of the feedback shared. The two-way review system is a key element, allowing both service providers (coaches, trainers, gym owners) and individual users to contribute to the feedback ecosystem. This balanced approach ensures fairness and a more holistic representation of user experiences, contributing to a sense of ownership and engagement within the Gym Connect community. Community-building is at the core of this feature, encouraging open communication and constructive feedback. Users can share their experiences in detailed categories, such as professionalism, cleanliness, and overall effectiveness. This granularity provides nuanced insights for others and helps in making informed decisions about the various services offered within the platform. In recognition of the potential for public and private feedback, Gym Connect allows users to choose the level of visibility for their contributions. This flexibility empowers users to provide personal insights without compromising their privacy, while public reviews contribute to the collective knowledge of the community. The real-time updates and moderation processes within the Rating and Review feature ensure timely information for users. Whether it's positive recognition or addressing concerns, the platform remains responsive to maintain the integrity of the feedback system and foster a healthy community environment. To incentivize quality contributions, Gym Connect may implement recognition or perks for users who consistently provide thoughtful feedback. This creates a positive feedback loop, encouraging users to actively engage in the community and contribute to its continuous improvement.

Further, Calendar integration is a transformative feature within Gym Connect, enhancing user convenience by seamlessly merging health/dating and wellbeing activities with users personal calendars. This innovative functionality allows users to effortlessly organize and manage various activities, from workout sessions and sports events to social gatherings, within their preferred calendar applications such as Apple Calendar, Outlook, or Google Calendar. Key aspects of the Calendar Integration feature in Gym Connect include:

A) Diverse Health Activities: Users can send and receive requests for a wide range of health-related activities, including cricket matches, golf, gym sessions, or coffee dates. This diversity ensures that users can efficiently plan and coordinate their wellness routines and social interactions through matchmaking via interests.

B) Universal App Integration: The Calendar Integration feature is seamlessly woven throughout the Gym Connect app, ensuring a consistent and integrated experience. Users can access this functionality from various sections of the app, making it easily accessible when scheduling different health/social/well-being-related events.

C) Synchronization across Platforms: Calendar entries made within the Gym Connect app synchronize across multiple calendar platforms. Whether users prefer Apple Calendar, Outlook, Google Calendar, or other supported calendar applications, the integrated feature ensures uniformity and real-time updates.

D) User-Friendly Interface: Gym Connect's Calendar Integration boasts a user-friendly interface that simplifies the process of adding, modifying, or removing health activities from the calendar. The intuitive design enhances the overall user experience, making it easy for individuals to manage their schedules seamlessly.

E) Automated Updates: Any changes or updates to scheduled health activities within the Gym Connect app trigger automatic updates in the integrated calendar. This ensures that users are always informed of the latest details, reducing the risk of scheduling conflicts and promoting effective time management.

F) Privacy Controls: The Calendar Integration feature includes robust privacy controls, allowing users to choose the level of visibility for their health activities. Users can decide whether to share specific events publicly, within their Gym Connect community, or keep them private.

G) Notifications and Reminders: Integrated notifications and reminders enhance the user experience by providing timely alerts for upcoming health activities. This proactive approach helps users stay on track with their fitness goals and maintain a balanced lifestyle.

Furthermore, Gym Connect encourages individuals to actively contribute to the platform's supportive community by providing feedback. This inclusive approach fosters a sense of camaraderie and ensures that the community thrives on shared experiences and mutual support. Moreover, the social media feed within the platform serves as a dynamic space where users can not only connect but also share valuable content such as exercises, recipes, playlists, and more. Innovatively, Gym Connect introduces a new social media feature, reminiscent of Instagram but with a unique twist. Unlike other applications where content can be searched by manually typing, Gym Connect's system allows users to view content through pre-set filters applied by the user. This tailored approach ensures that users engage with content that aligns with their preferences and interests, offering a more personalized social media experience. Recognizing the importance of maintaining a safe and positive online environment, Gym Connect takes a proactive stance. Users can upload content based on pre-set areas of topics, mitigating the potential for offensive material. This thoughtful content categorization enhances the overall user experience and contributes to the creation of a supportive digital space. To further promote a safe and supportive community, Gym Connect introduces a member verification system based on real-life feedback. This means that users are verified not only through traditional methods but also through feedback provided by other members. This innovative approach adds an extra layer of authenticity, reinforcing the credibility of the community and fostering a sense of trust among its members.

Figure 2:
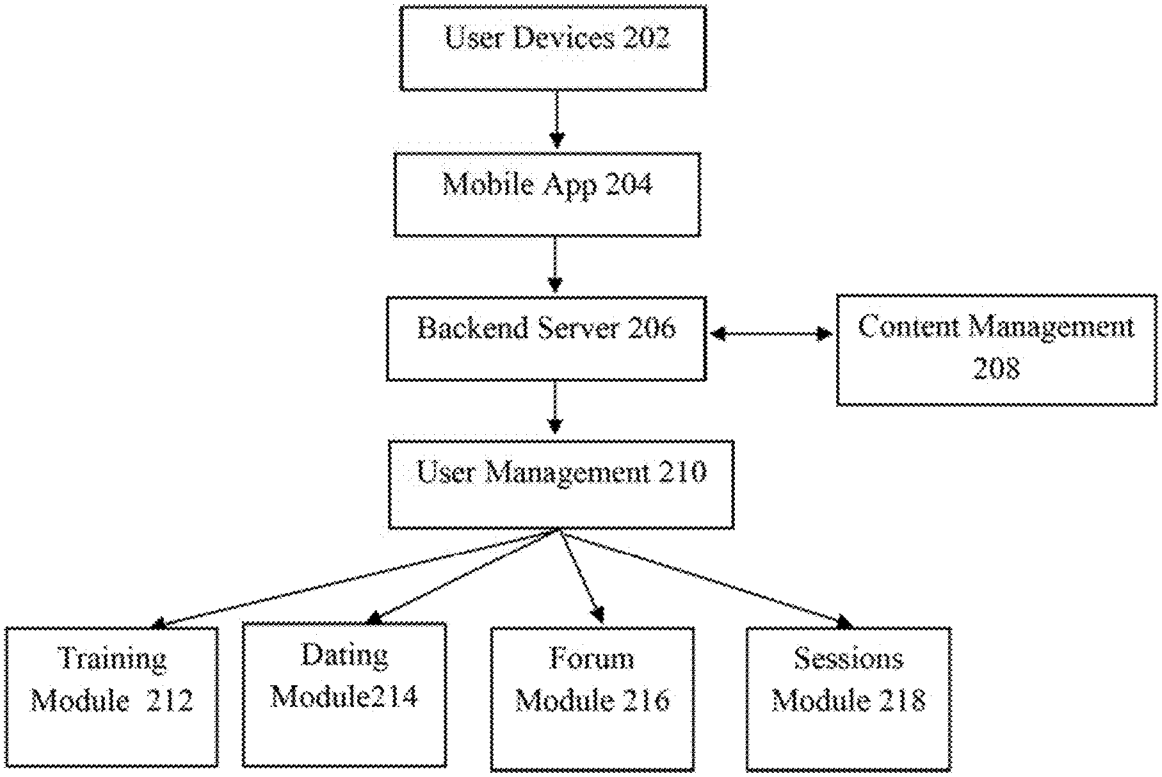
FIG. 2 is a block diagram representing the key components of the community connectivity platform architecture in a hierarchical structure, in accordance with one of the embodiments of the current invention.

FIG. 2 is a block diagram representing the key components of the community connectivity platform architecture in a hierarchical structure, as per one of the embodiments of the current invention. The user devices interact with the mobile app, which communicates with the backend server. The backend server acts as the central component, managing data processing and storage.

A community connectivity platform aka Gym Connect comprising a processor executing mobile readable instructions in modules, wherein the computer readable instructions stored in the memory of one or more mobile device; a backend server (206) for data processing and storage of one or more user profiles; a user management system (210) for registration and authentication of one or more users through blockchain; a training module (212) for identifying partners for co-training, scheduling sessions with partners, and communication with other users; a dating module (214) for safe dating with verified members, wherein the verified members are authenticated on registration via blockchain; a forum module (216) for accessing wellness-related content and engaging with one or more experts, wherein the experts are being part of the platform; a sessions module (218) for accessing videos and booking sessions with experts, partners and other members of the platform.

User Devices (202): User devices represent the hardware component of the community connectivity platform and include smartphones, tablets, and other mobile devices. These devices serve as the primary interface for users to access the app and its features. Users can install the community connectivity platform on their iOS or Android devices, allowing them to interact with the application's functionalities.

Mobile Application (204): The mobile application represents the software component of the community connectivity platform. It is installed on users' devices and provides the user interface for accessing and utilizing the features of the app. The mobile application communicates with the backend server and other components to facilitate data exchange and functionality.

Backend Server (206): The backend server is the central component that manages the app's data processing and storage. It includes servers, databases, and other infrastructure to handle user authentication, data storage, and communication between various components. The backend server interacts with the mobile application to process user requests, store user data, and retrieve information when required.

Content Management (208): The supplier interface, which allows community staff, individuals, and entrepreneurs to upload schedules, classes, timetables, and other relevant information, would typically be considered as part of the backend server component. Admins retain ultimate control over all features and content, ensuring heightened security and mitigating the upload of offensive material. Suppliers undergo thorough Know Your Customer (KYC) and Know Your Business (KYB) verifications, adding an extra layer of credibility. This verification process not only enhances security but also significantly reduces the likelihood of offensive material being uploaded to the platform. By maintaining control over all aspects, Gym Connect ensures a safe and trustworthy environment for users, promoting a positive and inclusive community experience. The supplier interface would be a separate application specifically designed for suppliers or administrators to manage and update the data and information related to schedules, classes, timetables, and other offerings within the community connectivity platform. The supplier interface would have its own user interface and functionalities to facilitate the management of supplier-related data. It would interact with the backend server to store and retrieve the updated information, respond to user issues and wellness concerns through the messaging/chat functionality, and ensure synchronization with the community connectivity platform. Therefore, the supplier interface would be integrated into the backend server architecture, serving as a complementary tool for suppliers to interact with and update the community connectivity platform data.

User Management System (210): The user management system handles user registration, authentication, and profile management. It securely stores user information and credentials, allowing users to access their accounts and personalize their profiles. The user management system interacts with the backend server to manage user-related data and authentication processes.

Training module (212): The training platform includes features related to finding training partners, scheduling sessions, and communication. It encompasses components such as partner search, session scheduling, in-built chat functionality, and feedback system. These components enable users to search for partners based on specific criteria, schedule sessions, communicate through messaging, voice calls, and video chats, and provide feedback on training experiences.

The training platform interacts with the custom backend server to retrieve and store relevant data.

Dating module (214): The dating platform provides features for safe dating among verified community members. It includes components such as profile matching, date scheduling, in-built chat functionality, and questionnaires. These components facilitate the matching of compatible individuals, scheduling dates, communication through messaging, voice calls, and video chats, and gathering feedback through tailored questions. The dating platform interacts with the custom backend server to retrieve and store user data and facilitate matching processes. The Dating/Social feature in Gym Connect takes a cutting-edge approach to matchmaking by integrating artificial intelligence (AI) and facial recognition technology. This innovative functionality aims to enhance user experiences by introducing a unique method of pairing individuals based on their facial features. Gym Connect employs advanced AI algorithms on the backend to analyze facial features and characteristics. The AI takes into account various factors, creating a sophisticated matching system that goes beyond conventional dating preferences. The core of the Dating/Social feature is the use of facial recognition technology. This technology enables the app to identify and compare facial features of users, providing a more nuanced and personalized matchmaking experience. The program is designed to match users based on similarities in their facial features. This goes beyond traditional matchmaking criteria, offering a unique and potentially more accurate way to connect individuals who share common visual traits. Gym Connect prioritizes user privacy and security in the implementation of the facial recognition feature. Robust measures are in place to safeguard user data and ensure that the technology is used responsibly and ethically. The Dating/Social feature allows users to set preferences and controls for their matching criteria. Users can customize their preferences, indicating the importance of facial features in their matches and providing a degree of flexibility in the matchmaking process. To enhance the matchmaking accuracy, Gym Connect encourages users to create comprehensive profiles. This includes providing additional information beyond facial features, such as interests, hobbies, and fitness goals, ensuring a holistic approach to compatibility. The AI continuously refines its matching algorithms based on user interactions and feedback. Real-time updates ensure that the matchmaking process evolves, becoming increasingly accurate over time. The Dating/Social feature aims to create an inclusive social environment where individuals can connect based on both shared facial features and common interests. This approach fosters a diverse and vibrant community within Gym Connect.

In addition, the Dating/Social feature in Gym Connect introduces automated dating processes coupled with personalized support, creating a comprehensive and user-centric environment. Gym Connect streamlines the dating experience by automating certain aspects. After a mutual match, users have 48 hours to express interest in taking the connection further. If both users agree, an automated request is sent to schedule a video call or plan an in-person date. This approach adds efficiency and encourages timely interactions. The automated system facilitates the scheduling of video calls or in-person dates, fostering quicker and more meaningful connections. Users have the flexibility to choose the mode of interaction that suits them best, whether it's an initial video call or a face-to-face meeting. Gym Connect recognizes the importance of guidance and support in the dating journey. To enhance the user experience, the platform introduces 1-2-1 specialists dedicated to providing advice on various relationship topics. Users can seek expert guidance on navigating dating challenges, enhancing communication, or fostering healthy relationships. The 1-2-1 specialists offer personalized advice tailored to individual user needs. Whether it's assistance in creating an engaging profile, navigating first dates, or addressing specific relationship concerns, users can access expert guidance to enrich their dating experience. Users can conveniently access the 1-2-1 specialists directly within the Gym Connect app, creating a seamless and integrated experience. The in-app consultation feature ensures that users can seek advice and support without leaving the platform. Gym Connect places a high priority on user privacy and confidentiality. Interactions with 1-2-1 specialists are secure and private; allowing users to discuss personal matters with confidence and receive guidance in a safe environment. The feature also allows auto deletion of text should the user wish. The dating feature continuously learns from user interactions, feedback, and success stories. This iterative process helps refine the automated dating processes and enhances the effectiveness of the 1-2-1 specialist support, ensuring a continually improving user experience. Gym Connect encourages users to provide feedback on their dating experiences and interactions with 1-2-1 specialists. This feedback loop helps the platform adapt and tailor its services to meet the evolving needs of its user community.

Moreover, the Dating module in Gym Connect incorporates an advanced integration of Artificial Intelligence (AI) on the backend, enhancing the matching process by programmatically considering physical features of users. This sophisticated AI algorithm is designed to analyze and compare various facial and physical attributes, providing a nuanced and personalized approach to matchmaking. The AI-powered matching system takes into account a range of physical features, such as facial structure, body type, and other relevant characteristics. The goal is to create connections that go beyond conventional dating preferences, offering users the opportunity to find compatibility based on shared physical traits. The backend programming allows for continuous learning and refinement of the AI algorithms over time. As users interact with the platform, providing feedback and engaging in dating activities, the system adapts to better understand individual preferences and improve the accuracy of future matches. This iterative process ensures that the AI continually evolves to meet the dynamic needs of the Gym Connect dating community. Privacy and security are paramount in the integration of AI for physical feature matching. Gym Connect takes measures to protect user data, ensuring that sensitive information is handled with the utmost care. By implementing advanced security protocols and adhering to privacy standards, the platform aims to build trust among users who seek a safe and reliable dating experience. The AI-driven matching feature not only considers physical features but also complements other aspects of the Gym Connect dating experience. It works in tandem with the platform's verification process, real-life feedback, and tailored questions, creating a comprehensive approach to fostering genuine connections. This holistic strategy contributes to a dating environment that is not only technologically advanced but also user-centered and attuned to the diverse preferences of the community.

The Gym Connect Dating module introduces a seamless and dynamic dating experience through the integration of Automated AI Dating Requests, Calendar Integration, and specialized interactions with dating specialists-all within a unique coin system. Gym Connect's cutting-edge AI technology automates the dating process by generating personalized matchmaking requests. This feature analyzes user profiles, preferences, and physical features to suggest potential matches, streamlining the dating experience and promoting meaningful connections. The platform enhances user convenience by seamlessly integrating dating activities into personal calendars. Users can schedule dates, plan meetups, or engage in virtual interactions with matches, and these events are automatically added to their calendars. This ensures organized and efficient coordination of dating activities. Gym Connect introduces a unique feature allowing users to engage with dating specialists directly within the platform. Users can use the coin system to message specialists, seeking advice on relationship topics, enhancing their dating strategies, or addressing any concerns they may have. This personalized support adds an extra layer of guidance to the dating experience. The Gym Connect platform utilizes a coin system to facilitate interactions with dating specialists. Users can earn or purchase coins within the platform, and these coins act as a virtual currency for accessing premium features, including messaging specialists. This system provides a structured and rewarding approach to seeking expert advice. Gym Connect prioritizes user privacy and security in the coin-based interaction system. Robust measures are implemented to safeguard user data, ensuring that sensitive information is protected during messaging interactions with dating specialists. This emphasis on security contributes to a safe and trusted dating environment. The coin system not only facilitates interactions with specialists but also serves as a mechanism to reward user engagement within the platform. Users can earn coins through various activities, fostering a sense of community and incentivizing positive contributions to the Gym Connect dating experience.

Forum module (216): The forum platform provides access to content related to wellbeing, including blogs, videos, and posts. It includes components such as content management, user engagement, in-built chat functionality, and messaging system. These components enable users to access, interact with, and share wellbeing-related content, engage with other users through likes, shares, and comments, and communicate with specialists through messaging. The forum platform interacts with the custom backend server to retrieve and store content and facilitate communication. The Gym Connect Forum module not only serves as a hub for well-being content such as blogs, videos, and posts but also offers an innovative platform for aspiring blog writers. Within this module, writers can seamlessly upload their posts for admin review and subsequent publishing, presenting a unique opportunity for potential career advancement in the well-being and fitness space. Furthermore, the inclusion of video content, encompassing meditation, frequency based healing music, and other well-being topics, directly accessible on users' mobile channels, enhances the overall well-being journey by providing a diverse range of resources for users to explore and incorporate into their daily routines. This multifaceted approach ensures that the Gym Connect platform not only fosters community engagement but also supports the growth and development of well-being enthusiasts and content creators alike.

Sessions module (218): The online/exclusive session's platform allows users to access videos of inspiring speakers, book sessions with trainers or coaches including relevant leisure passes and interact with the content. It includes components such as video management, session booking, in-built chat functionality, and interactive features. These components enable users to access and view session videos, book sessions with professionals, and communicate through messaging, voice calls, and video chats. The online/exclusive session's platform interacts with the backend server to retrieve and store session data and facilitate communication.

Pass module (220): The Pass Module within the app revolutionizes the way users access gym facilities and events by offering a streamlined purchasing process that eliminates the need for physical visits. Users can effortlessly browse, select, and purchase passes through the app, unlocking instant access to a vibrant community hub where they can arrange health, training, and event sessions for both members and non-members attending the venue. This feature not only fosters community engagement but also empowers users to take control of their fitness journey and social experiences within the venue's ecosystem. Additionally, the Pass Module serves as a welcoming entry point for new users, allowing them to seamlessly discover and explore the venue's offerings while connecting with like-minded individuals from the moment they join. Overall, the Pass Module enhances the user experience by combining convenience, connectivity, and personalized experiences, ultimately redefining how users interact with and enjoy the amenities available at the venue.

The community connectivity platform is a versatile platform designed to connect the entire community through a single application. It is available on both iOS and Android platforms, ensuring accessibility for a wide range of users. The app's flexibility allows it to be fully customized to meet the specific needs of its audience. The app enables instant connectivity among members, faculty, and staff members throughout the community. It serves as a central hub for communication, collaboration, and engagement. Also, the community connectivity platform offers extensive customization options to tailor the app's functionalities and appearance to the community's requirements. This ensures that the app aligns with the specific branding, features, and policies of the institution.

The app provides various communication channels, such as messaging, forums, and announcements, facilitating seamless interaction among users. This enhances communication within the campus community and encourages engagement. Admins, in particular, wield the ability to send notices, participate in discussions, and facilitate community-wide interactions, creating a dynamic and inclusive environment where users can easily connect, share information, and stay informed about relevant updates. This feature not only strengthens the sense of community but also provides a centralized platform for meaningful and efficient communication within the Gym Connect ecosystem.

Users can access an events calendar that showcases community-wide activities, including sports events, workshops, seminars, and social gatherings. This feature helps users stay updated on the latest happenings and encourages participation in various events. Additionally, the integration of this feature with users' personal calendars ensures seamless planning and scheduling, enhancing the overall user experience and encouraging active involvement in the vibrant array of activities offered by the Gym Connect platform. As the name suggests, the community connectivity platform can include fitness tracking features that allow users to track their workouts, set goals, and access resources related to fitness and well-being. The tracking of user performance is accomplished through a comprehensive rating system and feedback mechanism. After completing a workout or fitness session with a partner, users have the opportunity to leave feedback for each other. This rating and feedback process not only fosters accountability and motivation but also ensures quality assurance and safety within the community. It builds trust among users, contributes to personalized matching, and enhances the overall workout partner experience, creating a supportive and effective fitness network. This promotes a healthy lifestyle within the community.

In an embodiment, the app can be integrated with various community facilities, such as gymnasiums, sports arenas, libraries, and cafeterias. This integration enables users to check facility availability, make reservations, and access relevant information. Further, the app can send push notifications and alerts to users regarding important announcements, deadlines, community updates, calendar integrations, or emergency situations. This ensures that users stay informed in real-time. Feedback and Surveys: The community connectivity platform can include features for gathering feedback and conducting surveys. This allows the community administration to gather insights, opinions, and suggestions from the community to continuously improve the community experience. Notably, this feature extends to all coaches on the application, including wellness and dating coaches, ensuring that insights from users contribute to creating a stronger and safer community. The vetting process by admins further adds an extra layer of assurance, fostering a community where only trusted individuals contribute to the collective improvement and evolution of the Gym Connect platform.

Figure 3A:
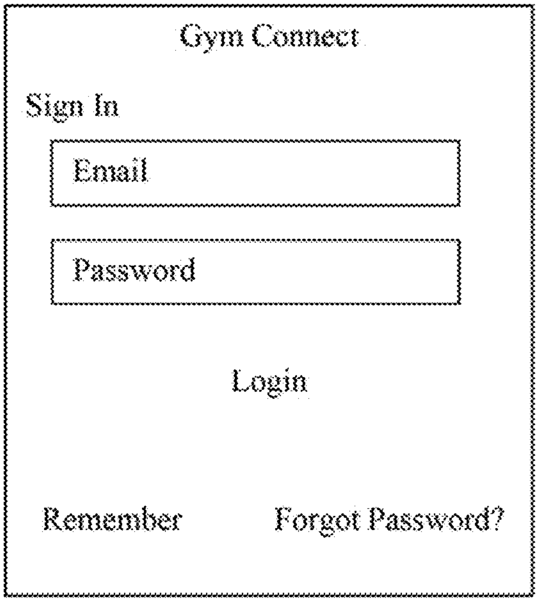
FIGS. 3*a*-3*b* represent the multiple interfaces of the community connectivity platform, in accordance with one of the embodiments of the current invention.
Figure 3B:
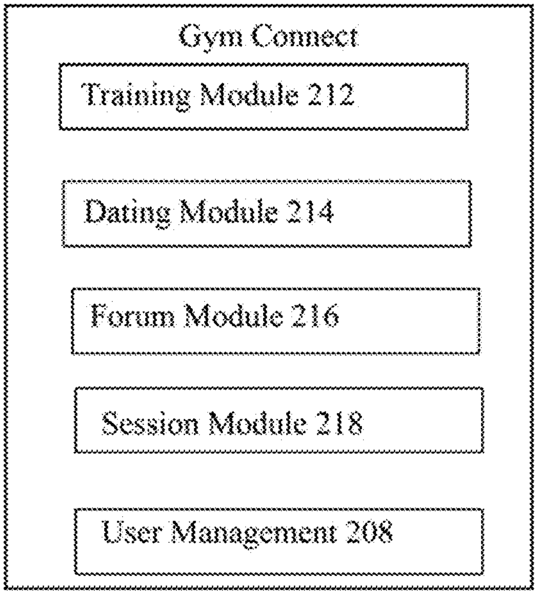

FIGS. 3*a*-3*b* represent the multiple interfaces of the community connectivity platform. Overall, the community connectivity platform serves as a comprehensive tool for enhancing community connectivity, communication, and engagement. Its customizability enables universities to adapt the community connectivity platform to their unique needs, creating a unified platform for the entire community.

The community connectivity platform interface for the login functionality (FIG. 3*a*), including options to enter an email and password, remember the login, and recover a forgotten password:

Email and Password Login: The login interface will have fields for users to enter their email and password. The user can also login or sign-up using google or Facebook account integrated with the login page. Users will enter their registered email address and password associated with their community connectivity platform account. The interface will provide clear input fields to input the email and password securely. Remember Me: The login interface will have a checkbox or toggle button labeled "Remember Me" or "Keep me logged in". When users check the "Remember Me" option during login, the community connectivity platform will store their login credentials on the device, allowing them to stay logged in even after closing the app or restarting their device. This feature provides convenience by eliminating the need to re-enter login credentials for subsequent app sessions.

Forgot Password: The login interface will include a "Forgot Password" link or button. Alternatively, the app may also offer an OTP (One-Time Password) option for password recovery. When users select this method, they will receive a unique OTP on their registered mobile number or email address. After verifying the OTP, users can proceed to reset their password and regain access to their account. If users forget their password, they can click on the "Forgot Password" link or button. This action will redirect them to a password recovery interface, where they can provide their registered email address. The community connectivity platform will then send an email to the provided email address with instructions on how to reset their password.

Password Recovery: The password recovery interface will prompt users to enter their registered email address. Users will enter their registered email address in the provided field and submit the request. The community connectivity platform will verify the email address and send a password reset link or a temporary password to the user's email. Users can follow the instructions in the email to reset their password and regain access to their account.

FIG. 3*b* shows the interface once the user has logged in to the Training Interface.

Find a partner for gym/health sessions, sports activities, dating/social activities walking, gaming, or coffee: Interface on Mobile: The user will see a search or discovery interface where they can browse through profiles of other app users who are interested in gym sessions, sports activities, walking, gaming, or even meeting for a coffee/recreational activity. Users can filter and search for potential partners based on their interests, location, availability, and preferences. The app will display profiles that match their criteria, including information such as name, profile picture, interests, and availability. This can be anywhere in the globe or simply adding the facility through the "add gym/location function" which brings up a global list. Simply add that location to be connected to that community, anywhere at any time in the world.

Schedule in-person sessions based on date, time, location, gender, level, and goals: The user will have a scheduling interface where they can select the desired date, time, location, and specify preferences regarding gender, skill level, and fitness goals. Users can choose a date, time, and location for their desired in-person session. They can also specify preferences such as the gender of their partner, skill level, images filters and fitness goals. By applying these filters, users can narrow down their search and find potential partners who align with their specific criteria. For users who prefer a quicker approach, Gym Connect also offers the option to skip the filters and directly view a larger range of results. This streamlined experience allows users to explore potential matches without filtering through specific preferences, making it easier to connect with compatible partners based on other shared interests and values. Gym Connect introduces a personalized interaction feature that enables users, once matched, to send training, health, or social requests to each other. The recipient has the choice to accept or decline the request, and if accepted, they can seamlessly integrate it into their current mobile or tablet calendar. This streamlined process enhances user convenience, fostering effective communication and coordination for shared fitness activities, health goals, or social engagements within the Gym Connect platform. By providing both filtered and non-filtered options, Gym Connect caters to different user preferences and allows individuals to navigate the app according to their unique dating style. This versatility ensures that users can enjoy a personalized and efficient dating experience, finding meaningful connections based on their individual priorities and preferences. The app will show available partners who meet these criteria.

Gym Connect's integrated communication system offers users a seamless experience for connecting with their training partners through text messages, voice calls, or video chats directly within the platform's in-built chat/call functionality. Accessible on mobile devices, this feature enables users to initiate communication, discuss session details, ask questions, or provide updates in real-time. Importantly, this functionality is restricted to connected users, providing an additional layer of safety and ensuring that communication is limited to trusted individuals within the Gym Connect community. This integrated communication tool enhances user engagement, fostering effective and secure interactions between training partners.

Provide feedback to build a community: The user will have an interface where they can provide feedback on their training sessions and overall experience with their partners. After each session, users can provide feedback with 24 hour automated system requests on their training partner, well-being coach or dating coach on session quality, and overall experience. They can rate their partner, leave comments, and share suggestions. The feedback is intended to foster a supportive and accountable community, helping users make informed decisions when selecting partners.

Use social media feed to upload exercises, recipes, playlists, etc.: The user will have a social media feed interface where they can share and view posts related to exercises, recipes, playlists, music, general posts and other fitness or health-related content. How it works: Users can create posts with text, images, videos, or links related to exercises, recipes, playlists, or any other fitness, health, or recreational content. They can filter what they want to view and share their own creations, comment on others' posts, and engage with the community. The feed interface serves as a dynamic space where users can discover posts from other community members, fostering inspiration and connections with like-minded individuals. Notably, users have the flexibility to curate their feed by removing unwanted posts, irrespective of the people or friends they are following. This personalized approach ensures that users can tailor their content consumption experience, creating a more engaging and relevant feed that aligns with their fitness, well-being, and social interests within the Gym Connect platform.

Dating Interface Date safely with verified community members: Interface on Mobile: The user will have a search interface where they can browse through profiles of verified community members who are interested in dating. How it works: The community connectivity platform verifies the community membership of users and displays profiles of verified members. The interface will show profile pictures, names, and relevant information of potential matches who have opted into the dating feature.

Gym Connect's dating feature offers users a comprehensive interface on mobile where they can explore real-life feedback from completed social or health sessions within the app. To assess compatibility, users have the option to answer tailored questions provided by potential matches. The platform also introduces new functionalities, including the ability to automate dating requests through Artificial Intelligence (AI). Additionally, users can engage in one-on-one messaging with a dedicated dating coach, enhancing the dating experience by providing personalized guidance and support within the Gym Connect dating ecosystem.

The Gym Connect platform utilizes health and life sessions as a unique approach to dating, encouraging users to connect through shared health, social and fitness interests. By facilitating real-life health and social interactions, users can gain meaningful feedback from potential matches, fostering a deeper connection beyond traditional dating parameters. This innovative approach allows individuals to prioritize wellness and shared values in their pursuit of potential partners, creating a dynamic and more authentic dating experience based on common health and lifestyle goals. Additionally, users can answer tailored questions designed to gauge compatibility. The interface will display this information to help users make informed decisions about potential dates.

Gym Connect Dating/Social experience also provides users with an option to ask a specialist on areas on this topic, by using the one-to-one specialist area. Users can ask a specialist covering a range of topics from relationship advice to physical. This allows users to seek help within one platform and anonymously.

The Gym Connect interface is designed to provide users with essential health and lifestyle information about potential dates, helping them make more informed decisions before engaging in conversations or meeting in person. This information may include fitness interests, exercise routines, dietary preferences, wellness goals, and other relevant details.

To enhance the user experience, Gym Connect incorporates unique features like "Turn up the temperature," "Cool down," or "Raise the bar.", each accompanied by custom animations that visually represent the corresponding dating and fitness experience. These unique elements not only add a dynamic and interactive dimension to the platform but also serve as intuitive and visually appealing indicators for users, enhancing their overall fitness journey within the Gym Connect ecosystem. These features allow users to indicate their desired level of social interaction or potential responses to potential matches.

For example: "Turn up the temperature" could indicate a higher interest in engaging in more active and dynamic conversations with potential matches.

"Cool down" might suggest a preference for more casual and laid-back interactions, taking things slow.

"Raise the bar" could signify a desire for deeper and more meaningful conversations with potential matches.

By using these features, users can tailor their dating/social experience according to their comfort levels, communication preferences, and desired level of social interaction. This approach fosters a more personalized and authentic dating journey, focusing on shared health interests and values. The incorporation of these unique features adds a dynamic and user-centric dimension to the dating process, empowering users to find compatible matches based on both physical and emotional compatibility.

Schedule a date (e.g., coffee, social, sporting exercise, yoga): Interface on Mobile: The user will have a scheduling interface where they can select a date and activity for their desired activity and then once a request is accepted the user can add this into their own personal calendars, with a seamless integration. How it works: Users can choose a date from the available options and select an activity for the date, such as meeting for coffee, going for a sporting exercise, or practicing yoga together. The interface will provide a calendar or date picker along with activity options to facilitate the scheduling process. In the Gym Connect platform, user profiles are accepted or rejected using the "Turn up the temperature," "Cool down," or "Raise the bar" features. "Turn up the temperature" indicates that a user's profile has been accepted, signaling mutual interest. Conversely, "Cool down" indicates that a user's profile has been rejected, signaling a lack of interest. "Raise the bar" serves as a super like, expressing an exceptional level of interest in a potential match.

Gym Connect offers users' insights into their profile views and incorporates a unique feature of presenting both unique and pre-determined dating questions. These custom, carefully selected questions aim to streamline the dating process by fostering meaningful interactions and providing a more nuanced understanding of potential matches. This personalized approach adds depth to the dating experience within the Gym Connect platform, encouraging users to connect on a more authentic level through thoughtful and tailored inquiries. Moreover, Gym Connect stands out from other dating platforms by offering unique dating questions, adding an innovative and personalized touch to the matching process. These custom questions provide users with opportunities to share insights about their wellness journey, lifestyle preferences, or specific interests, fostering deeper connections based on shared values. Furthermore, the platform provides users with the ability to see who has viewed their profile. This feature offers a sense of transparency and engagement, allowing users to gauge interest and potential connections. This further provides real life feedback for user's profiles based on health completed sessions Call, message, and video chat through in-built chat functionality: Interface on Mobile: The user will have an in-built chat interface where they can communicate with their potential date through text messages, voice calls, or video chats. How it works: Users can initiate communication with their potential date through the in-built chat functionality or after 48 hours using the automated Ai dating feature which schedules a pre-determined activity in order to speed the dating process up. They can send text messages, make voice calls, or initiate video chats to get to know each other better and discuss the date details. The chat interface ensures real-time communication and privacy between the users. Which the calendar integration speeds up the dating or courting part by providing an option to move on from the messaging approach and more to a scheduled dating approach (EG call, coffee or recreational activity)

The Dating feature of the community connectivity platform allows users to safely date verified community members. The mobile app provides intuitive interfaces for each step, including searching for potential matches, viewing real-life feedback and answering tailored questions, scheduling dates with preferred activities, and communicating with potential dates through in-built chat functionality. These interfaces and features enhance the user experience, promotes safe dating, and facilitate connections within the community.

The dating feedback side also allows users to seek 1-2-1 private support by messaging the qualified specialist on the platform, and then once completed they are able to leave a review directly of the specialist profile encouraging a more safe and supportive community. This also provides opportunities for the specialist to gain more business by attracting positive reviews.

Forum Interface (306): Access content on demand (blogs, videos, posts) related to wellbeing: Interface on Mobile: The user will have a feed or content interface where they can access a variety of on-demand content related to wellbeing, such as blogs, videos, music, frequency healing and posts. How it works: The community connectivity platform provides a curated collection of content on various wellbeing and life topics. Users can scroll through the feed or use search functionality to discover and access content of their interest. The interface will display content previews or thumbnails to entice users to explore further.

Like, share, and follow wellness experts on various topics: Interface on Mobile: The user will have options to like, share, and follow wellness experts or content creators who specialize in different wellbeing topics. How it works: Users can interact with the content by liking posts, sharing them with others, and following wellness experts to receive updates on their latest content. The interface will provide intuitive buttons or icons to perform these actions, allowing users to engage with the content and experts they find valuable.

Create a personal wellbeing board to track meaningful posts: Interface on Mobile: The user will have a feature to create a personal wellbeing board where they can save and track posts that resonate with them. How it works: Users can save posts or create a collection of their favorite or most meaningful content. They can create personalized boards or categories to organize and track these posts for future reference. The interface will allow users to easily save and manage their boards within the app, whilst budding content creators can submit their posts to admin to be displayed on the main forum section. Encouraging a more robust community whilst also potentially helping individuals increase job opportunities.

Message qualified wellbeing specialists through the app: Interface on Mobile: The user will have an in-built messaging interface to directly message qualified wellbeing specialists based globally. How it works: Users can send private messages to qualified wellbeing specialists through the app. They can ask questions, seek advice, or discuss concerns related to their wellbeing. The messaging interface ensures secure and confidential communication between users and specialists, fostering a supportive environment. This valuable service incurs a cost that is activated only when the specialist exceeds a specific word count in their response, ensuring fair compensation for their expertise while providing users with an accessible and cost-effective means of seeking personalized guidance and support. Unlike other app Gym connect puts users and making it accessible by countries with lower disposable incomes. The expert or specialists may charge for his/her services based on the user's requirements and expertise required. A charge is only triggered when the wellbeing coach has triggered a minimum quantity word response. Users are then prompted to provide feedback through a rating system for the wellbeing coaches services, which builds a stronger safer community of coaches.

For instance, if the specialist's response stays within a predetermined word count limit, there might be no cost incurred, making it an affordable option for users. However, if the specialist's response exceeds the specified word count, a cost will be applied to compensate the specialist for their time and expertise. This approach strikes a balance between providing users with an accessible and cost-effective means of accessing professional support and ensuring that the specialists are adequately compensated for their services. It also encourages users to be concise and specific with their inquiries while maximizing the value they receive from the interactions. Making this model suitable for lower GDP economy countries where the capita per spend is lower than others with higher.

Overall, this messaging feature facilitates direct communication with wellbeing experts, encouraging users to prioritize their mental and physical health while fostering a fair and sustainable model for both users and qualified specialists on the platform. Coaches/trainers can be anywhere in the world by using the supplier interface to respond.

Call, message, and video chat through in-built chat functionality: Interface on Mobile: The user will have options to call, message, or initiate video chat with other users or specialists through the in-built chat functionality. How it works: Users can communicate with other forum members or qualified specialists through the app's chat functionality. They can initiate calls, send text messages, or initiate video chats for real-time discussions, support, or guidance. The chat interface provides seamless communication within the app.

Session Interface): Access inspiring speakers (athletes, celebrities, entrepreneurs) through videos: Interface on Mobile: The user will have a dedicated section or interface where they can access a collection of videos featuring inspiring speakers, including athletes, celebrities, and entrepreneurs. How it works: The community connectivity platform provides a curated library of videos featuring inspiring speakers. Users can browse through the collection and select videos of their interest. The interface will display video thumbnails, titles, and brief descriptions to help users choose the content they want to explore further.

Attend live or pre-recorded sessions and ask questions: Interface on Mobile: The user will have options to attend both live and pre-recorded sessions. During live sessions, there will be a chat interface where users can ask questions. How it works: Users can choose to attend live sessions scheduled by the community connectivity platform. They can join the session at the designated time and interact with the speaker and other participants through a chat interface, where they can ask questions, share insights, and engage in discussions. Additionally, users can also access pre-recorded sessions that they can watch at their convenience and saved to their profiles.

Aspiring speakers or any users conducting online sessions through the app can logon to their own supplier interface with their own user ID, and they can initiate the video call or chat function and answer directly questions of both options and then be compensated by the app's inbuilt payment feature.

Book sessions with personal trainers, life coaches, or wellbeing coaches: Interface on Mobile: The user will have a booking interface where they can browse and book sessions with personal trainers, life coaches, or wellbeing coaches. How it works: The community connectivity platform offers a selection of personal trainers, life coaches, and wellbeing coaches. Users can explore their profiles, including their areas of expertise, qualifications, and availability. The interface will allow users to select a preferred coach or trainer, view their available sessions, and book an appointment or session based on their convenience and goals. Users will be prompted with a feedback session once the session is complete fostering a transparent and safe community.

In an embodiment, the Supplier interface is a separate component of the community connectivity platform, catering to community staff, individuals, and entrepreneurs. It allows them to upload schedules, classes, timetables, and more, and respond to members issues using the messaging/chat function including answering questions for live video sessions.

The Supplier interface will have a secure login screen where authorized users can enter their credentials to access the app. Users will input their username or email and password to log into the Supplier interface. The interface will include appropriate security measures to ensure secure access. This will be verified on the backend by using signing up through the website, then logins generated. Once logged in, users will be presented with a dashboard that provides an overview of relevant information and activities. The dashboard interface will display important information such as the current schedules, classes, and timetables. It may include visual representations, notifications, or summary views to provide a clear overview of the uploaded information.

Further, the Supplier interface will have dedicated sections or forms where users can upload schedules, classes, timetables, and other relevant information. Users will have access to the necessary fields and options to upload and update schedules, classes, timetables, and other related information. The interface will provide a user-friendly way to input and manage these details. The Supplier interface will include a messaging or chat interface where community coaches, trainers, and staff can communicate with member regarding issues and wellness concerns. The messaging or chat interface will allow staff members to view and respond to member inquiries, concerns, or requests. They can engage in real-time conversations, exchange messages, provide guidance, or address student needs within the app. The Supplier interface provides an intuitive interface that allows community staff, individuals, businesses, trainers and entrepreneurs to upload schedules, classes, timetables, and more. It also facilitates communication between community coaches, trainers, and staff with member regarding their issues and wellness concerns through the messaging and chat functionality. The app ensures efficient management and effective communication to support the community's needs. In an aspect of the invention the supplier interface can be a separate app.

In an embodiment the platform includes a rewards module that encourages users for positive interactions and feedback and rewards them with goods/services redeemable from the Gym Connect website would be an excellent way to promote engagement, customer loyalty and positive wellbeing. Users would register on the rewards platform to participate. They can sign up using their email, social media accounts, or a dedicated account for the platform. Users would earn points or rewards for various positive interactions and actions. Examples of such interactions could include:

Providing feedback on services, products, or experiences.

Participating in surveys or polls to help improve the platform or services.

Referring friends or new customers to the Gym Connect website.

Sharing experiences or posts on social media related to Gym Connect.

The rewards module would track each user's positive interactions and reviews that they receive and provide them with points or rewards accordingly. The more positive actions they take, the more points they earn. The users can browse through a catalog of goods and services available for redemption. These rewards could include Gym Connect merchandise (t-shirts, water bottles, gym bags, etc.), discounted or free gym sessions/classes, personal training sessions, Gym equipment or supplements. Also, Users can choose the reward they want to redeem and use their accumulated points to make the transaction. The platform would then provide instructions on how to claim the reward, which could involve an online voucher, a unique code, or a physical coupon. To further motivate users, the platform could incorporate gamification elements, such as levels or tiers based on the number of points earned. Higher tiers could unlock exclusive rewards or perks. The platform keeps users engaged by sending notifications about new rewards, bonus point opportunities, or upcoming events. Communication through email, push notifications, or in-app messages can be used to inform users about their point balance and remind them of available rewards. The platform analyzes user behavior and feedback to improve services, understand user preferences, and optimize the rewards program. Whilst also providing a personal integrated calendar option for users and coaches by having booked sessions from health, social/dating to wellbeing. Overcoming a common problem globally of missed appointments which are normally sent via text messaging, gym connect integrates into personal calendars.

A mobile application facilitating community connectivity through one or more modules.

User Management module: This modules handles user registration and authentication processes, ensuring secure access to the application's features. It manages user profiles, preferences, and account settings.

Training Feature: Within the application, users can access various fitness and wellness resources, including workout routines, nutrition plans, and educational content.

Scheduling System: Users can schedule in-person sessions with their chosen partners through this feature. They can specify preferences such as date, time, location, gender, fitness level, and goals to find compatible partners for workouts or other activities.

Chat Functionality: The application includes built-in chat functionality, allowing users to communicate with their partners via text messages, voice calls, and video chats. This fosters real-time interaction and collaboration, strengthening community bonds.

Feedback Mechanism: Users can provide feedback to each other, sharing experiences, offering support, and giving constructive criticism. This feedback loop promotes community building and continuous improvement within the platform.

Social Media Feed: The application integrates a social media feed where users can share various fitness and wellness-related content, such as exercise routines, healthy recipes, motivational quotes, and progress updates. This encourages engagement and facilitates the exchange of ideas among community members. White labeling the Gym connect platform as a SAAS service offers a comprehensive and versatile solution for Gym connect and potential partner businesses in the fitness industry. By adopting a white label approach, Gym connect allows other businesses, such as gyms, health centers, wellness companies, and anyone with a business that requires a complete SAAS booking, scheduling and payment system to utilize their rewards and customer engagement platform while rebranding it with their own logos, colors, and design elements. One of the primary advantages of white labeling is that it enables partners to seamlessly integrate the rewards and customer engagement features into their existing services by using the geo-location already built in and by saving costs by using gym connect own staff. They can offer a unified and consistent experience to their customers, strengthening their brand identity and loyalty. For example, a fitness center can incorporate the rewards platform, wellbeing platform into its mobile app or website, or use the software as a standalone platform only for its members which provides members with a seamless and branded experience when interacting with the rewards and incentive system, whilst keeping a track of user's wellbeing given the high numbers of wellbeing issues now being identified. It also allows businesses owners to send messages or update any notices, for example day closures or restrictions by communicating with users quicker.

Another benefit is the expedited time-to-market for partners. Developing a fully comprehensive platform that encompasses booking, scheduling, messaging, rewards and more from scratch can be time-consuming and resource-intensive. With the white label solution, partners can quickly launch the customized platform, as most of the core functionalities and features are already developed and tested by Gym connect. This rapid deployment allows partners to start engaging their customers with the rewards program without lengthy development efforts, thereby gaining a competitive edge in the market. The white label platform is designed to be scalable, ensuring that it can accommodate businesses of varying sizes, from small local gyms to large fitness chains and any other facility (business or non-business related, globally). Regardless of the partner's scale, the platform can handle a growing number of users and interactions without compromising on performance or user experience.

Gym connect can also provide technical support, maintenance, and regular updates to partners, ensuring that the platform runs smoothly and reliably. This minimizes the burden on partners' internal technical teams, allowing them to focus on their core operations while entrusting the technical aspects to Gym connect. Security and data privacy are crucial considerations for any rewards platform. Gym connect, as the platform provider, can guarantee adherence to industry-standard security protocols and data protection regulations. This instills confidence in partners and their customers that their personal information is safeguarded.

From a business standpoint, white labeling creates a diversified revenue stream for Gym connect. Instead of solely providing rewards and customer engagement services to end-users, Gym connect can charge licensing fees, subscription-based access, or other revenue-sharing models to partners who use the white label platform. This opens up new avenues for revenue generation and helps Gym connect to expand its market reach.

On the partners' side, they gain access to a comprehensive and feature-rich customer engagement solution without the need for extensive development efforts. The white label platform empowers them to tailor the rewards program to their unique requirements, fostering increased loyalty and interaction within their fitness communities.

Overall, white labeling the Gym connect platform as a software service creates a mutually beneficial arrangement. Gym connect expands its business offerings and revenue potential, while partner businesses acquire a powerful and customizable rewards platform that strengthens their brand and enhances customer engagement in the competitive fitness industry.

A computer or any other computing device having connected to the network is used for a secure online survey system using differential privacy. The computer system has a processing unit, a memory for storage, Network Interface Unit, I/O unit, and a display device. At least one processor may be implemented as one or more microprocessors, microcomputers, microcontrollers, digital signal processors, central processing units, state machines, logic circuitries, and/or any devices that manipulate signals based on operational instructions. Among other capabilities, the at least one processor is configured to fetch and execute computer-readable instructions stored in the memory.

As used herein, the term tool, system and method may refer to software, firmware, hardware, or other component that can be used to effectuate a purpose. The engine will typically include software instructions that are stored in non-volatile memory (also referred to as secondary memory). When the software instructions are executed, at least a subset of the software instructions can be loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

The I/O device may comprise one or more I/O devices, such as a keyboard, touch screen, stylus, microphone, speaker, scanner, and/or the like.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory may include modules, routines, programs, objects, components, data structures, etc., of encryption.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

While the subject invention is described and illustrated with respect to certain preferred and alternative embodiments, it should be understood that various modifications can be made to those embodiments without departing from the subject invention, the scope of which is defined in the following claims.

I claim:

1. A community connectivity platform comprising:

a processor of a user device executing computer readable instructions stored in a memory;

a custom backend server in communication with the user device the backend server configured to perform data processing storage of user profiles, and execution of module-specific operations;

a custom user management system interacts with the custom backend server, the user management system configured to:

register and authenticate one or more users using blockchain-based verification, and maintain verified user identity data without storing sensitive authentication data on centralized servers;

a supplier interface communicatively coupled to the backend server, the supplier interface configured to:

receive and update structured schedule data including classes, timetables, and session availability, and transmit the structured schedule data to the backend server for real-time synchronization with user devices;

a training module executed by the processor in coordination with the backend server, the training module configured to:

process multi-parameter user input including date, time, location, level, and goals, identify candidate training partners using the processed input, and generate and transmit session scheduling data that is automatically synchronized with a calendar interface and enabled for real-time communication through integrated messaging, voice, or video channels;

a pass module, executed by the processor of the user device in coordination with the backend server, the pass module configured to:

generate a digitally unique access pass associated with a selected venue, assign a time-stamped identifier to the access pass to prevent duplication, and validate the access pass through the backend server for enabling controlled access to a corresponding community;

a dating or social interaction module, executed by the processor of the user device in coordination with the backend server, the dating module configured to:

perform user matching using an artificial intelligence engine executed on the backend server, extract and process facial feature data of users using facial recognition techniques to generate feature representations, compare the feature representations in combination with user-defined preferences to determine compatibility scores, and iteratively update the matching process based on user interaction feedback to improve subsequent matching accuracy, wherein the module further generates automated scheduling data for initiating interactions between matched users and synchronizes the scheduling data with a calendar interface;

a forum module, executed by the processor of the user device in coordination with the backend server, the forum module configured to:

retrieve and deliver categorized content including blogs, videos, and posts, enable interaction with the content through structured user actions including saving, following, and messaging, and store feedback data associated with user interactions for subsequent retrieval and processing; and a session module, executed by the processor of the user device in coordination with the backend server, the session module configured to:

stream live or pre-recorded session content, receive user-generated interaction data including queries during live sessions, and process booking requests for sessions with experts and transmit corresponding scheduling data to the backend server; and a social media feed module configured to:

apply predefined content filters to user-generated content prior to display, and control content visibility based on the applied filters to reduce transmission of undesired content.

2. The community connectivity platform of claim 1, wherein the dating or social interaction module allows users to schedule dates with activities such as sporting exercises, social sessions or health/activity sessions with other users or partners.

3. The community connectivity platform of claim 1, wherein a filter module, executed by the processor of the user device, allows the user to create, and view content based on the filter.

4. A method for facilitating community connectivity through a mobile application executed by a processor of a user device, comprising the steps of:

providing a mobile application accessible on multiple devices;

registering and authenticating one or more users using blockchain-based verification;

maintaining verified user identity data without storing sensitive authentication data on centralized servers;

receiving and updating structured schedule data including classes, timetables, and session availability, and transmitting the structured schedule data to the backend server for real-time synchronization with user devices;

processing multi-parameter user input including date, time, location, level, and goals;

identifying candidate training partners using the processed input; and generating and transmitting session scheduling data that is automatically synchronized with a calendar interface and enabled for real-time communication through integrated messaging, voice, or video channels;

generating a digitally unique access pass associated with a selected venue;

assigning a time-stamped identifier to the access pass to prevent duplication; and validating the access pass through the backend server for enabling controlled access to a corresponding community;

performing user matching using an artificial intelligence engine executed on the backend server;

extracting and processing facial feature data of users using facial recognition techniques to generate feature representations;

comparing the feature representations in combination with user-defined preferences to determine compatibility scores;

iteratively updating the matching process based on user interaction feedback to improve subsequent matching accuracy, wherein the module further generates automated scheduling data for initiating interactions between matched users and synchronizes the scheduling data with a calendar interface;

retrieving and delivering categorized content including blogs, videos, and posts;

enabling interaction with the content through structured user actions including saving, following, and messaging; and storing feedback data associated with user interactions for subsequent retrieval and processing;

streaming live or pre-recorded session content, receiving user-generated interaction data including queries during live sessions, and processing booking requests for sessions with experts and transmit corresponding scheduling data to the backend server;

applying predefined content filters to user-generated content prior to display; and controlling content visibility based on the applied filters to reduce transmission of undesired content.

* * * * *